Aug. 15, 1950
A. C. BROUN
2,518,520
MEASURING DISPENSER HAVING A CYLINDRICAL CHAMBER
AND A ROTARY MEASURING ELEMENT MOUNTED THEREIN
Filed June 20, 1947
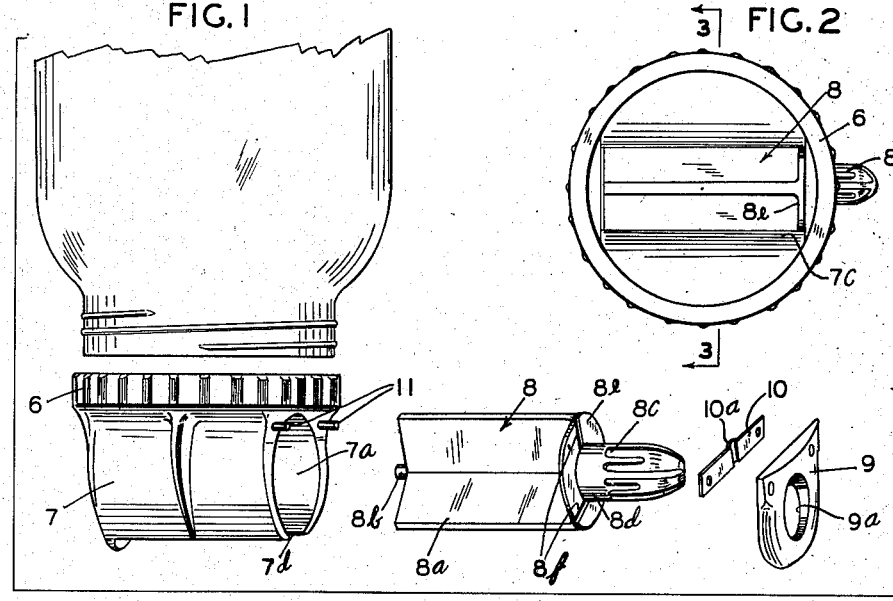
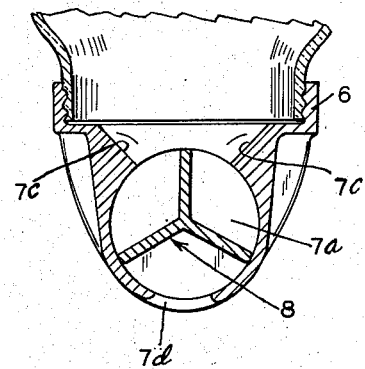
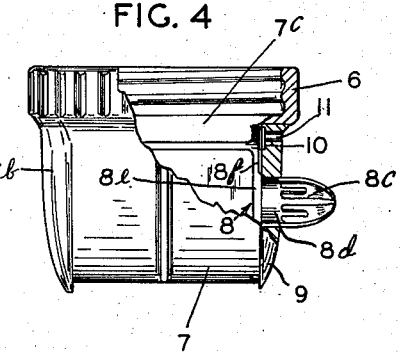
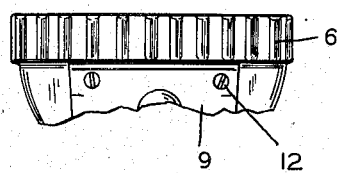
Inventor
ARCHIBALD C. BROUN
By Williamson + Williamson
Attorneys Patented Aug. 15, 1950

2,518,520

UNITED STATES PATENT OFFICE 2,518,520

MEASURING DISPENSER HAVING A CYLINDRICAL CHAMBER AND A ROTARY MEASURING ELEMENT MOUNTED THEREIN

Archibald C. Broun, Cook, Minn.

Application June 20, 1947, Serial No. 756,012

2 Claims. (Cl. 222—368)

This invention relates to devices for accurately measuring and dispensing predetermined quantities of granular or comminuted solid material.

It is an object of my invention to provide a very simple, inexpensive but highly efficient measuring dispenser, particularly adapted to be readily applied to conventional containers such as Mason jars and to quickly and accurately dispense from the discharge or delivery end thereof, a predetermined measurement of the material from the container.

While capable of wide general use, my invention has particular adaptability for conveniently dispensing measured quantities of food materials such as coffee, tea, flour, sugar and the like.

It is a further object to provide a measuring dispenser of the class described wherein the device may be readily attached to or detached from a conventional container such as a Mason jar enabling the assembly to be mounted in inverted position and having convenient means for turning a measuring element a predetermined distance to measure and discharge a desired quantity of the material.

Another object is the provision of a dispenser of the class described which will substantially exclude air from the contents of the container and which is constructed to permit adequate cleaning and sterilization of parts.

More specifically, it is an object to provide a dispenser of the class described which will lend itself to inexpensive manufacture by molding process from such materials as plastics and metal; which comprises essentially, two working parts and which will withstand long continued usage.

These and other objects and advantages of my invention will be more apparent from the following description made in connection with the accompanying drawings, wherein like reference characters refer to similar parts throughout the several views and in which:

Fig. 1 is an exploded view showing all of the parts of an embodiment of the invention separated, in position for assembly and attachment of the device to an inverted Mason jar;

Fig. 2 is a top plan view of the same;

Fig. 3 is a section taken on the line 3—3 of Fig. 2;

Fig. 4 is a view partly in vertical section and partly in side elevation showing the device detached; and Fig. 5 is a fragmentary end elevation showing a side closure plate for the shell body detachably secured to the shell.

In the embodiment of the invention illustrated the body of my device is in the form of an inverted shell which may be conveniently molded from plastic materials or metal having an annular attachment flange 6 as shown, of an internal diameter and internally threaded to readily engage and be secured to the threaded neck of a conventional container such as a Mason jar. The shell body, as shown, has an integrally formed, generally cylindrical main portion 7 mounted within the confines of the external diameter of attachment flange 7 and depending therefrom and being constructed on its interior surface to define a generally cylindrical measuring chamber 7a, the bore of said chamber extending from one end of the shell body to a point closely adjacent the opposite end forming an end closure wall 7b.

The said chamber 7a is in open communication with the interior of the upper portion of the shell and to facilitate feeding and sliding of material inwardly, converging or sloping surfaces 7c are provided in the construction of the shell. At the outer end of the shell, a longitudinal, horizontal, transverse slot 7d is provided, constituting the discharge for a measured quantity of granular or other flowable material. It will be noted that the interior of the body or shell 7 defines in conjunction with the discharge 7d, a material-flow passage extending therethrough, with the intermediate portion defining the substantially cylindrical measuring chamber 7a.

Within measuring chamber 7a, a rotary or oscillatory measuring element indicated as an entirety by the numeral 8 is journaled and as shown, comprises an integrally formed, preferably molded or cast, member consisting in a series of elongated radially extending wings or partitions 8a having straight longitudinal edges which work with close clearance within the cylindrical side wall portions of the measuring chamber 7a. An axial trunnion 8b is provided at one end of the measuring member journaled in a suitable socket or bearing provided in the interior of the end wall 7b of the shell. The opposite end of measuring member 8 as shown, is provided with an axial turning knob 8c having a cylindrical journaled portion 8d adjacent its connection with an end disc 8e, preferably integrally formed with the radial partitions 8a. An end plate 9 is provided for the shell body being circularly apertured to provide a bearing 9a in which the journal 8d of the turning knob is journaled. A spring retaining plate 10 having a central detent 10a of U-shape, is interposed between the inner side of end disc 8e of the measuring element. The detent 10a is adapted to yieldingly engage and cooperate with radial slots 8f formed in the outer face of disc 8e to indicate the desired predetermined discharge positions of the measuring element and to retain the measuring element therein.

In the form of the invention shown in Figs. 1 to 4, the end plate 9 as well as the yieldable retaining plate 10, are secured to the open end of measuring chamber 7a of the shell by means of horizontal pins or studs 11 which may be integrally formed or molded from the material of the shell 7 and which extend through registering apertures in the upper portions of end plate 9. Assuming the material from which the device is made is plastic, the ends of the pins 11 may be fused with the similar material of the end plate to secure the parts compactly with the measuring element confined and accommodated in operative position.

As shown, the oscillatory measuring element is provided with three radial partitions defining three measuring compartments although it will of course, be understood that the number may be varied as desired.

In operation, when my dispenser is applied to the open end of a container and the container is inverted, a turn of the measuring element through the prescribed arc (as shown, 120°), shifts one of the charged compartments defined by the radial partitions 8a to discharge position, as shown in Fig. 3, whereby the material is dropped by gravity through said longitudinal discharge slot dispensing a measured charge in a confined, dense stream. The required turning of the measuring element is readily detected by the snapping of the detent 10a of the spring member 10 into the next groove 8f at the disc end of the measuring element and the measuring element is thus retained in the discharge position for the next cycle of operation.

It will, of course, be understood that various changes may be made in the form, details, arrangement and proportions of the parts without departing from the scope of my invention.

What I claim is:

1. A measuring dispenser for granular material comprising a shell body having an open attachment end adapted to be connected with a container and having a material-flow passage extending therethrough and in communication with said open attachment end, said body having a discharge opening at the outer end thereof, the interior of said shell body between said open end and said discharge opening defining a cylindrical measuring chamber constituting a part of said passage and having its axis disposed perpendicularly to the flow direction of said passage, said measuring chamber having a closed end and having an open end for facilitating insertion and assembly of a rotary measuring element, a rotary measuring element mounted axially within said chamber and having a plurality of radially arranged, charge-receiving compartments having outer edges disposed in close working clearance to the cylindrical internal wall of said chamber, said rotary measuring element having a journal at one end mounted for rotative bearing relation in the closed end of said cylindrical passage and having a series of circumferentially spaced detents in the opposite end corresponding to the number and positioning of said charge-receiving compartments, an end closure plate affixed to the open end of said cylindrical measuring chamber and having a bearing therein, an axial journal at the adjacent end of said measuring element rotatively mounted in said bearing, a knob affixed to said last mentioned journal and extending exteriorly of said shell member and a retainer member interposed and secured between said closure plate and the adjacent end of said measuring element and having a narrow, resilient element for selectively engaging the detents at the adjacent end of said rotary element.

2. The structure set forth in claim 1 wherein the end of said rotary measuring element adjacent said closure plate has affixed thereto a disc working in close clearance to the internal wall of said measuring chamber, said detents being in said disc and wherein said retainer member comprises a spring strip having a retainer-element-corrugation thereon to cooperate with said detents and means for securing said closure plate and said strip to the adjacent portion of said shell body.

ARCHIBALD C. BROUN.

REFERENCES CITED

The following references are of record in the file of this patent:

UNITED STATES PATENTS

| Number | Name | Date |
|---|---|---|
| 841,111 | Bromley | Jan. 15, 1907 |
| 852,603 | Hanlon | May 7, 1907 |
| 1,053,169 | Gillespie | Feb. 18, 1913 |
| 1,537,410 | Courtney | May 12, 1925 |
| 1,869,120 | Thoeming et al. | July 26, 1932 |
| 2,122,695 | Podwyszynski | July 5, 1938 |
| 2,324,032 | Schlabach | July 13, 1943 |